United States Patent
Raymond

(10) Patent No.: US 12,409,542 B2
(45) Date of Patent: *Sep. 9, 2025

(54) MULTI-USE HAMMER

(71) Applicant: Daniel J. Raymond, Saginaw, MI (US)

(72) Inventor: Daniel J. Raymond, Saginaw, MI (US)

(73) Assignee: Daniel J. Raymond, Saginaw, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,923

(22) Filed: Dec. 27, 2022

(65) Prior Publication Data

US 2023/0132983 A1    May 4, 2023

Related U.S. Application Data

(63) Continuation of application No. 16/808,751, filed on Mar. 4, 2020, now Pat. No. 11,548,131.

(60) Provisional application No. 62/813,421, filed on Mar. 4, 2019, provisional application No. 62/898,630, filed on Sep. 11, 2019.

(51) Int. Cl.
| | | |
|---|---|---|
| *B25F 1/00* | (2006.01) | |
| *B25D 1/04* | (2006.01) | |
| *B25G 1/10* | (2006.01) | |
| *B43L 7/00* | (2006.01) | |
| *G01B 3/04* | (2006.01) | |
| *G01B 3/56* | (2006.01) | |

(52) U.S. Cl.
CPC ............... *B25F 1/006* (2013.01); *B25D 1/04* (2013.01); *B25G 1/10* (2013.01); *B43L 7/00* (2013.01); *G01B 3/04* (2013.01); *G01B 3/56* (2013.01)

(58) Field of Classification Search
CPC .. B25F 1/006; B25D 1/04; B25G 1/10; B43L 7/00; G01B 3/04; G01B 3/56
USPC .................................................... 7/146
See application file for complete search history.

(56) References Cited

U.S. PATENT DOCUMENTS

| | | | | |
|---|---|---|---|---|
| 36,829 | A * | 11/1862 | Boeklen et al. ......... | B25D 1/00 7/165 |
| 103,678 | A * | 5/1870 | Stockwell ................ | B25D 1/00 7/164 |
| 640,452 | A * | 1/1900 | Date ........................ | B25D 1/04 254/26 R |
| 2,501,757 | A * | 3/1950 | Cagle ...................... | B25G 1/08 7/164 |
| 5,000,064 | A * | 3/1991 | McMahon ............... | B25D 1/06 81/24 |
| 5,826,466 | A * | 10/1998 | Weissbach ............... | B25H 7/00 7/164 |
| D468,181 | S * | 1/2003 | Hung ............................. | D8/78 |
| 6,598,858 | B2 * | 7/2003 | Santa Cruz ............. | B25D 1/04 81/26 |
| 7,168,339 | B2 * | 1/2007 | Nau ......................... | B25D 1/14 7/164 |
| 7,621,503 | B2 * | 11/2009 | Warren .................... | B25D 1/04 254/26 R |
| 2017/0266801 | A1 * | 9/2017 | Slansky ................... | B25D 1/04 |

* cited by examiner

*Primary Examiner* — Hadi Shakeri
(74) *Attorney, Agent, or Firm* — Dickinson Wright PLLC

(57) ABSTRACT

The hammer has a head and a handle which extends from the head. The head has at least two surfaces that face towards the handle and that lie in a common first plane. At least a portion of the handle extends linearly and perpendicularly from the first plane to allow a user to draw a straight line which is perpendicular to the first plane.

16 Claims, 16 Drawing Sheets

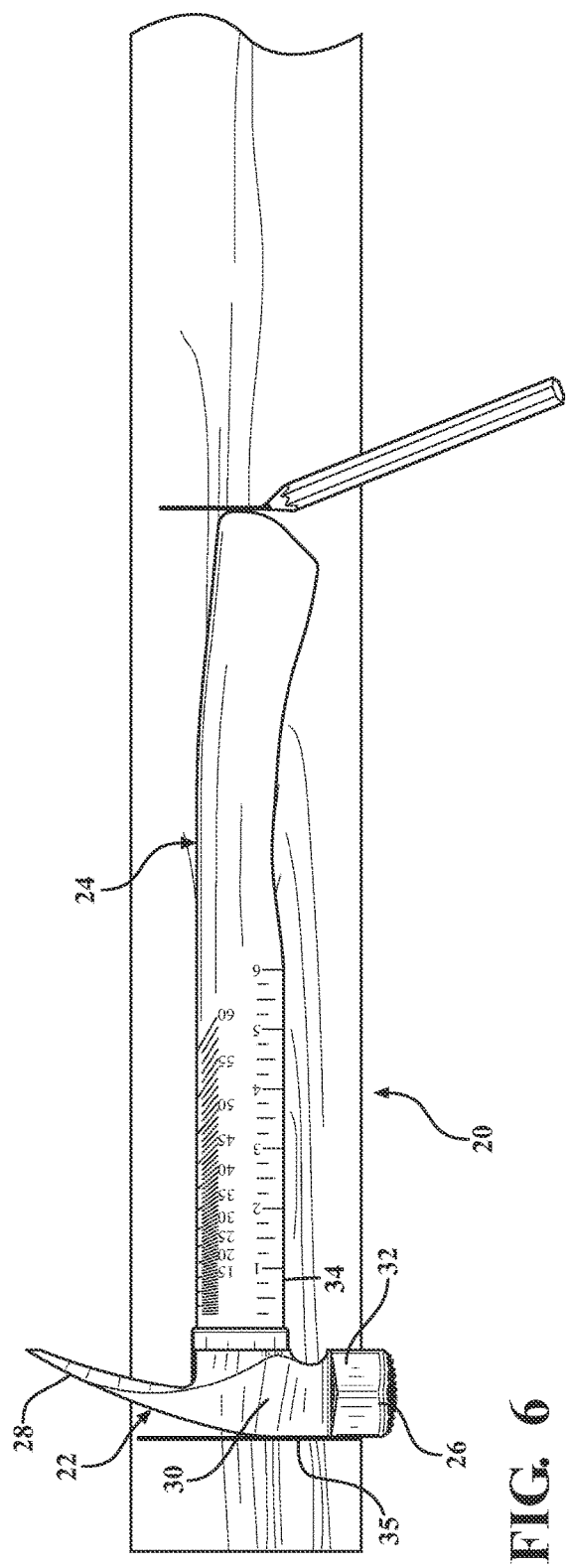
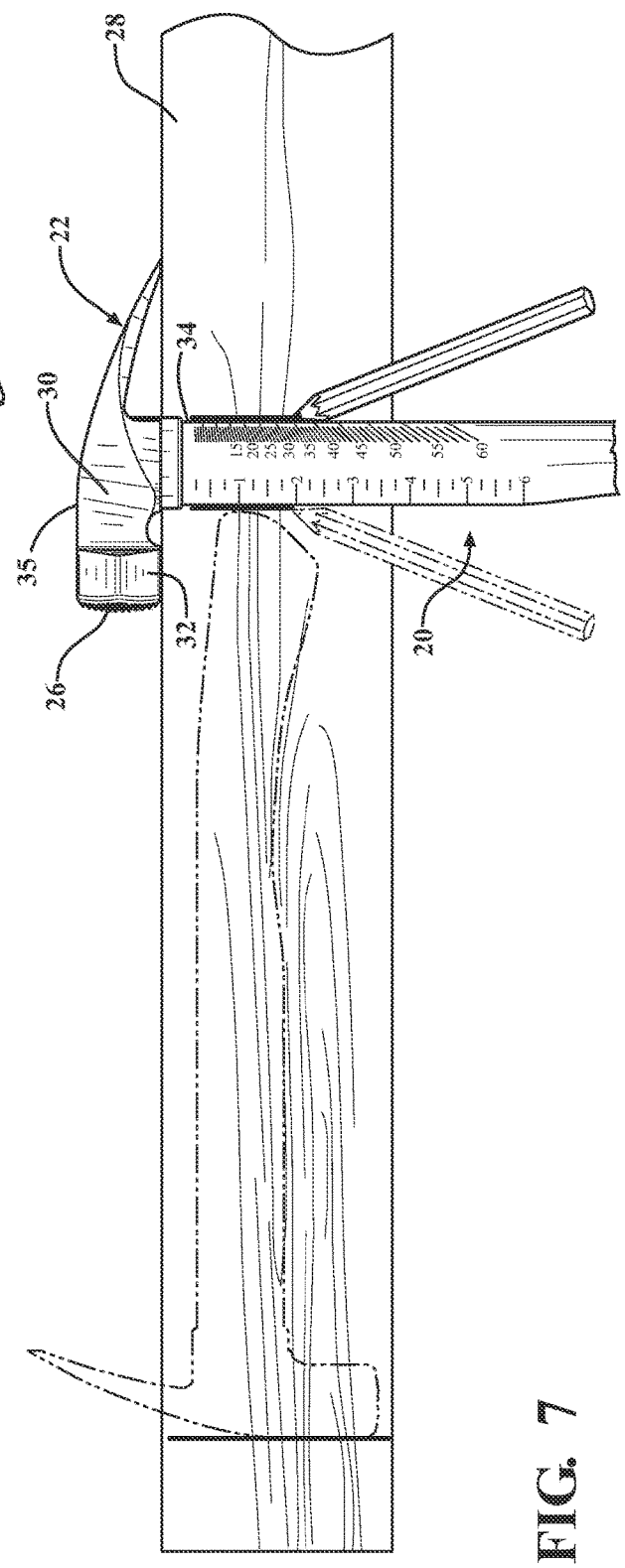
FIG. 6
FIG. 7

MULTI-USE HAMMER

CROSS-REFERENCE TO RELATED APPLICATION

This application claims priority to U.S. patent application Ser. No. 16/808,751, filed Mar. 4, 2020, titled "MULTI-USE HAMMER", U.S. Provisional Patent Application Nos. 62/813,421, filed Mar. 4, 2019, titled "HAMMER" and 62/898,630, filed Sep. 11, 2019, titled "HAMMER", the entire contents of these applications being incorporated herein by reference.

BACKGROUND OF THE INVENTION

1. Field of the Invention

The present invention is related generally to hammers and is more particularly related to hammers which have secondary functions.

2. Related Art

In the construction industry, workers regularly use a number of different tools for various functions related to building framing and shaping and hanging drywall sheets. Such tools often include a hammer, a stud finder, a ruler, and a T-square.

SUMMARY OF THE INVENTION

One aspect of the present invention is related to a hammer with a head and a handle which extends from the head. The head has at least two surfaces that face towards the handle and that lie in a common first plane. At least a portion of the handle extends linearly and perpendicularly from the first plane to allow a user to draw a straight line which is perpendicular to the first plane.

According to another aspect of the present invention, the head includes a front portion on one side of the handle and a pair of claws on an opposite side of the handle from the front portion and wherein the front portion has an outer surface that partially lies in the first plane.

According to yet another aspect of the present invention, the front portion of the head is hexagonally shaped with a side that lies in the first plane.

According to still another aspect of the present invention, the claws extend to respective ends which are located in the first plane.

According to a further aspect of the present invention, the head further includes a shoulder adjacent the handle and wherein the shoulder lies in the first plane.

According to yet a further aspect of the present invention, the handle further includes measurement indicia which indicates distance from the first plane.

According to still a further aspect of the present invention, the head includes a pair of claws which extend to respective ends and the handle further includes angle indicia which indicates angles relative to the ends of the claws.

According to another aspect of the present invention, the hammer is fourteen and a half inches long.

According to yet another aspect of the present invention, at least a portion of the handle of the hammer is one and a half inches wide.

According to still another aspect of the present invention, a magnet is attached with the handle.

According to a further aspect of the present invention, the handle has a plurality of spaced apart notches.

According to yet a further aspect of the present invention, the head has a groove for receiving a projection on a surface and wherein a writing instrument can be placed in one of the notches and the hammer can be rotated about the projection to draw a circle.

BRIEF DESCRIPTION OF THE DRAWINGS

These and other features and advantages of the invention will become more readily appreciated when considered in connection with the following description of the presently preferred embodiments, appended claims and accompanying drawings, in which:

FIG. 6 shows the hammer of FIG. 1 being used to measure a distance between neighboring studs;

FIG. 7 shows the hammer of FIG. 1 being used to measure the width of a stud;

DESCRIPTION OF THE ENABLING EMBODIMENTS

Referring to the Figures, wherein like numerals indicate corresponding parts throughout the several views, one aspect of the present invention is related to an improved multi-tool device which has the form of a hammer 20. As discussed extensively below, the hammer 20 has a number of built in features that are functional which allow the hammer 20 to perform other functions beyond pounding nails. These features are incorporated into the hammer 20 in such a way that the basic shape of the hammer 20 remains intact, and thus, the performance of the hammer 20 for driving nails is not compromised. In various embodiments discussed below, some (but not all) of the additional functions that the hammer 20 is able to perform include measuring and drawing angles; measuring lengths; locating studs behind a drywall sheet; tightening fasteners; starting nails; and starting fencing staples.

Figure 1:
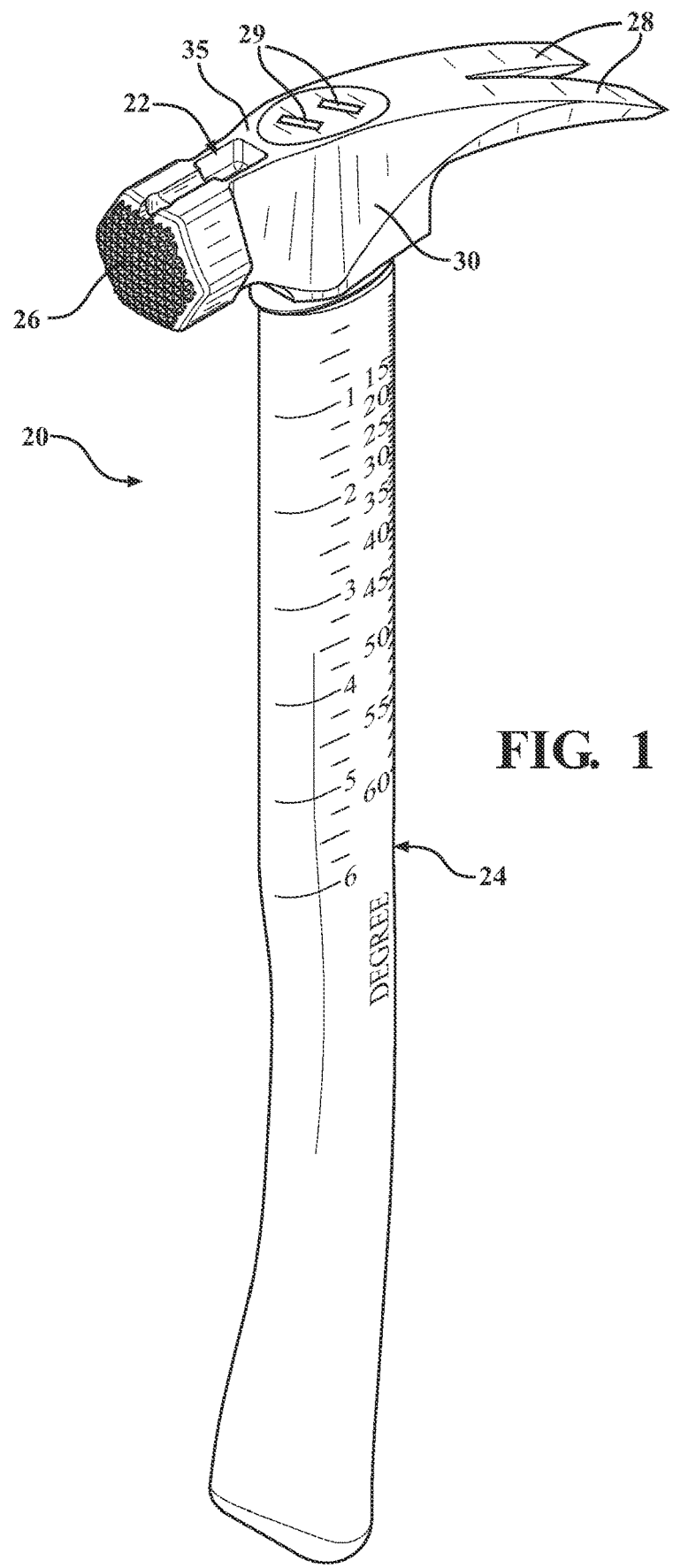
FIG. 1 is a perspective view of a hammer constructed according to a first embodiment of the present invention.
Figure 2:
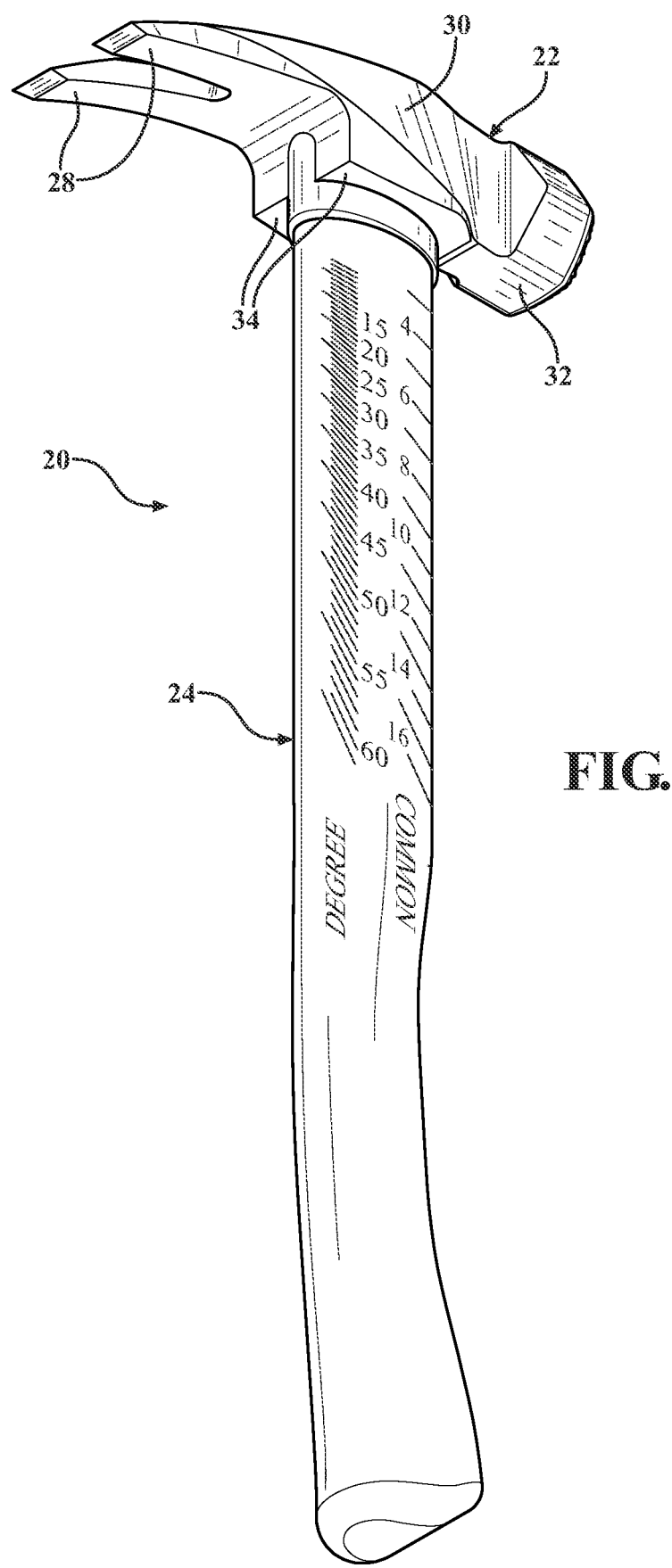
FIG. 2 is another perspective view of the hammer of FIG. 1 and taken from a different perspective than FIG. 1.

Referring to FIGS. 1-3, a first exemplary embodiment of the hammer 20 is generally shown. The hammer 20 has a head 22 and a handle 24 that extends away from the head 22 in a first direction. The head 22 extends in a second direction, which is perpendicular to the first direction, from a face 26 at one end to a pair of claws 28 at an opposite end. The head 22 has opposing cheeks 30 which lie in respective planes that are both perpendicular to a plane of the face 26. In the exemplary embodiment, the face 26 has a hexagonal shape and is textured. However, alternate shapes and configurations may be employed. The claws 28 are spaced apart from one another by a converging groove. As with conventional hammers, a user can hold and swing the hammer 20 from the handle 26 to drive nails with the face 26 and can pull nails with the claws 28. Thus, the hammer 20 satisfies the basic purposes of a conventional hammer.

In the first exemplary embodiment, the handle 24 of the hammer 20 is made out of wood or a thermosetting polymer matrix (fiberglass), and the head 22 is made out of metal (such as iron, steel, or an alloy steel). The metal head 22 is preferably shaped to its final shape through a casting or a forging operation. However, any suitable process or combination of processes may be employed. In the exemplary embodiment, the head 22 has an elliptical hole, and a top end of the handle 24 extends into the elliptical hole to connect the handle 24 with the head 22. During manufacture of the hammer 20, once the top end of the handle 24 is inserted into the proper position within the elliptical hole of the head 22, one or more wedges 29 are driven into the material of the handle to lock the handle 24 with the head 22. This configuration allows for cost savings through economies of scale by allowing the same head 22 to be used with differently configured handles. Also, while the connection between the handle 24 and the head 22 is fully secure, a user can switch handles by drilling out the top end of the existing handle 24, inserting the top end of a new different handle (which could be identical to or different than the handle 24), and driving a new wedge or new wedges into the new handle.

The hammer 28 can also be used to conveniently and easily draw ninety degree (90°) lines to the first and second planes on objects and to measure lengths in a manner similar to the use of a T-square. With reference to FIG. 3, to perform this function, the head 22 has at least two (three in the exemplary embodiment) co-planar features. Specifically, in the head 22, the three co-planar surfaces are a lower surface 32 of a front area adjacent the face 26, a shoulder 34 adjacent where the head 22 meets the handle 24, and the ends of the claws 28. In other words, all three of these features (the lower surface 32, the shoulder 34, and the ends of the claws 28) lie in a common first plane. Additionally. an uppermost surface 35 of the head 22 extends linearly in a second plane which is parallel to the first plane. At least one side surface of the handle 24 extends linearly from the head 22 and perpendicularly to the first plane for a distance which is greater than halfway from the head 22 to a distal end of the handle 24. In the exemplary embodiment, the side surfaces of the handle 24 are parallel with one another such that both side surfaces extend linearly from the head 22 and perpendicularly to the first plane.

Figure 4A:
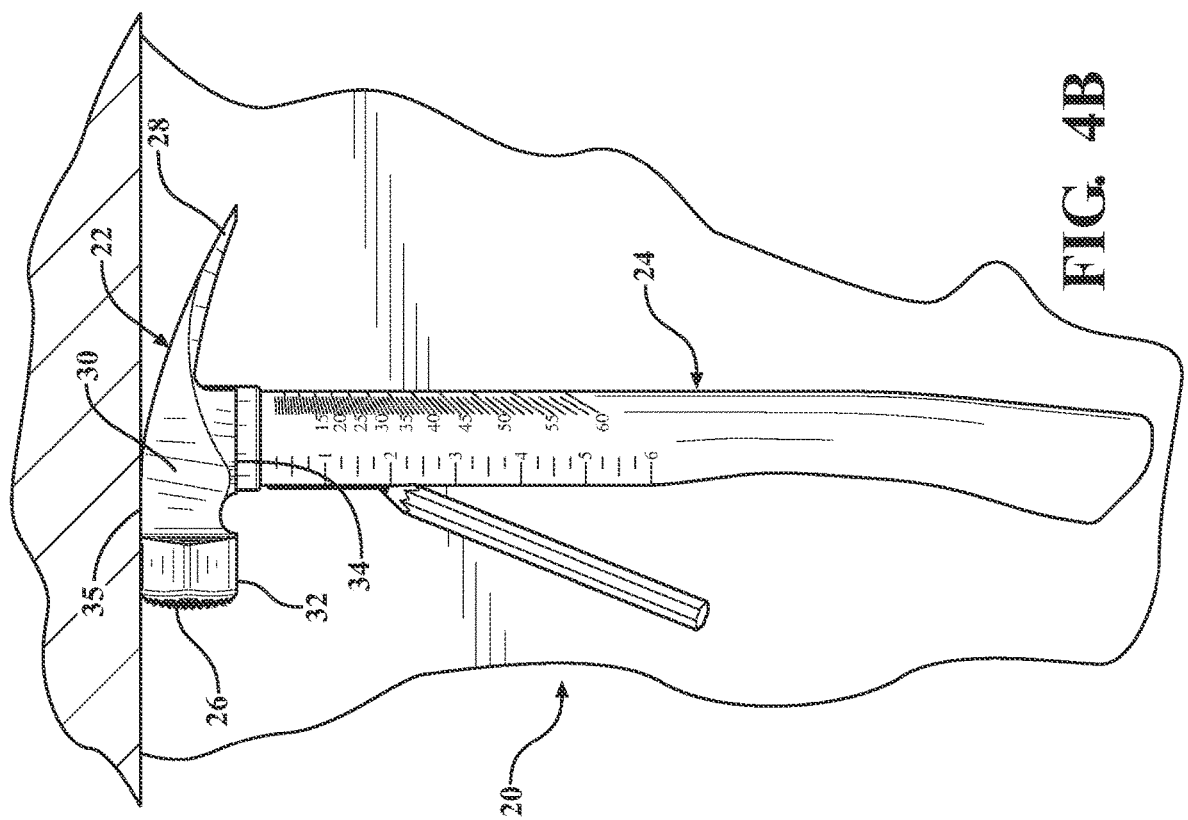
FIG. 4A shows the hammer of FIG. 1 being used to draw a line that is perpendicular to an edge of a wood board.
Figure 4B:
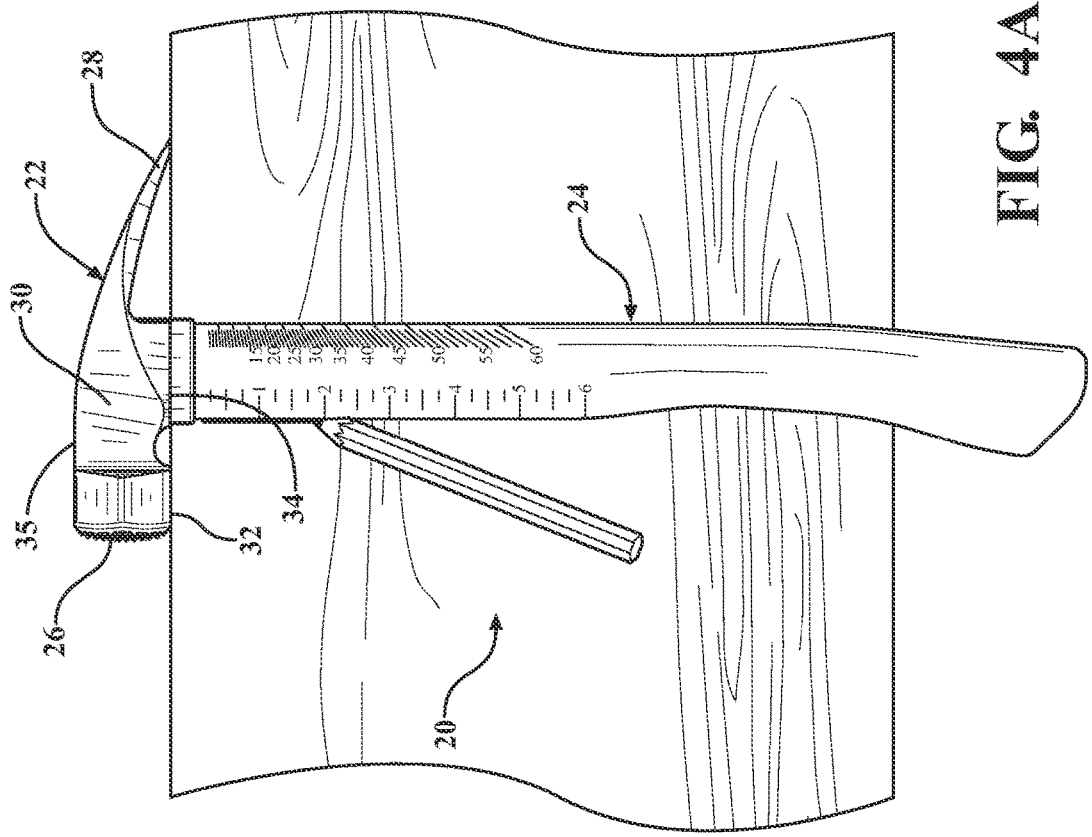
FIG. 4B shows the hammer of FIG. 1 being used to draw a line that is perpendicular to a wall.

Thus, as shown in FIG. 4A, one method of drawing a perpendicular line involves the user placing all three of the co-planar surfaces (the lower surface 32, the shoulder 34, and the ends of the claws 28) against a first surface, such as on a wood board. The user then uses the linear side surface on the handle 24 as a straight edge to draw a line on the wood board with a writing utensil. As shown in FIG. 4B, an alternate method of drawing a perpendicular line involves the user butting the uppermost surface 35 of the head 22 against a surface and using the linear side surface of the handle 24 as a straight edge to draw a line on the wood board.

Figure 3A:
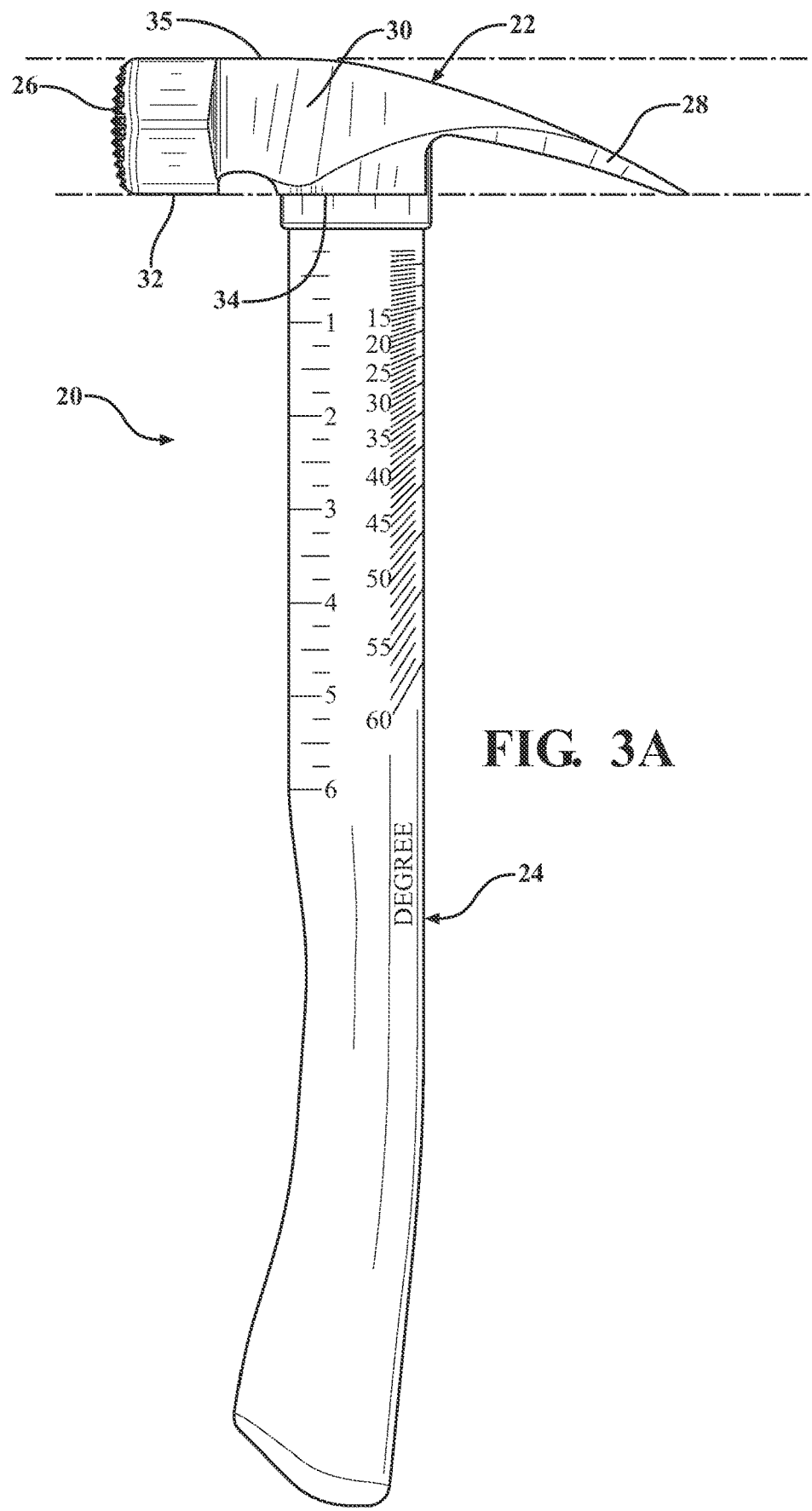
FIG. 3A is a front elevation view of the hammer of FIG. 1.

As shown in FIG. 3A, a front surface of the handle 24 is provided with indicia indicating the distance from the first plane. Accordingly, the hammer 20 can also be used as a ruler by placing all three of the co-planar surfaces (the lower surface 32, the shoulder 34, and the ends of the claws) against a first surface and using the indicia to measure a distance from that first surface. In the exemplary embodiment, the indicia for measuring length is in units of inches. However, any suitable unit for measuring length may be employed. Drawing perpendicular lines and taking length measurements are but two new functions that the hammer 20 can perform but conventional hammers cannot, and the features which allow for these new features do not interfere with the performance of the hammer 20 for driving and pulling nails.

Figure 3B:
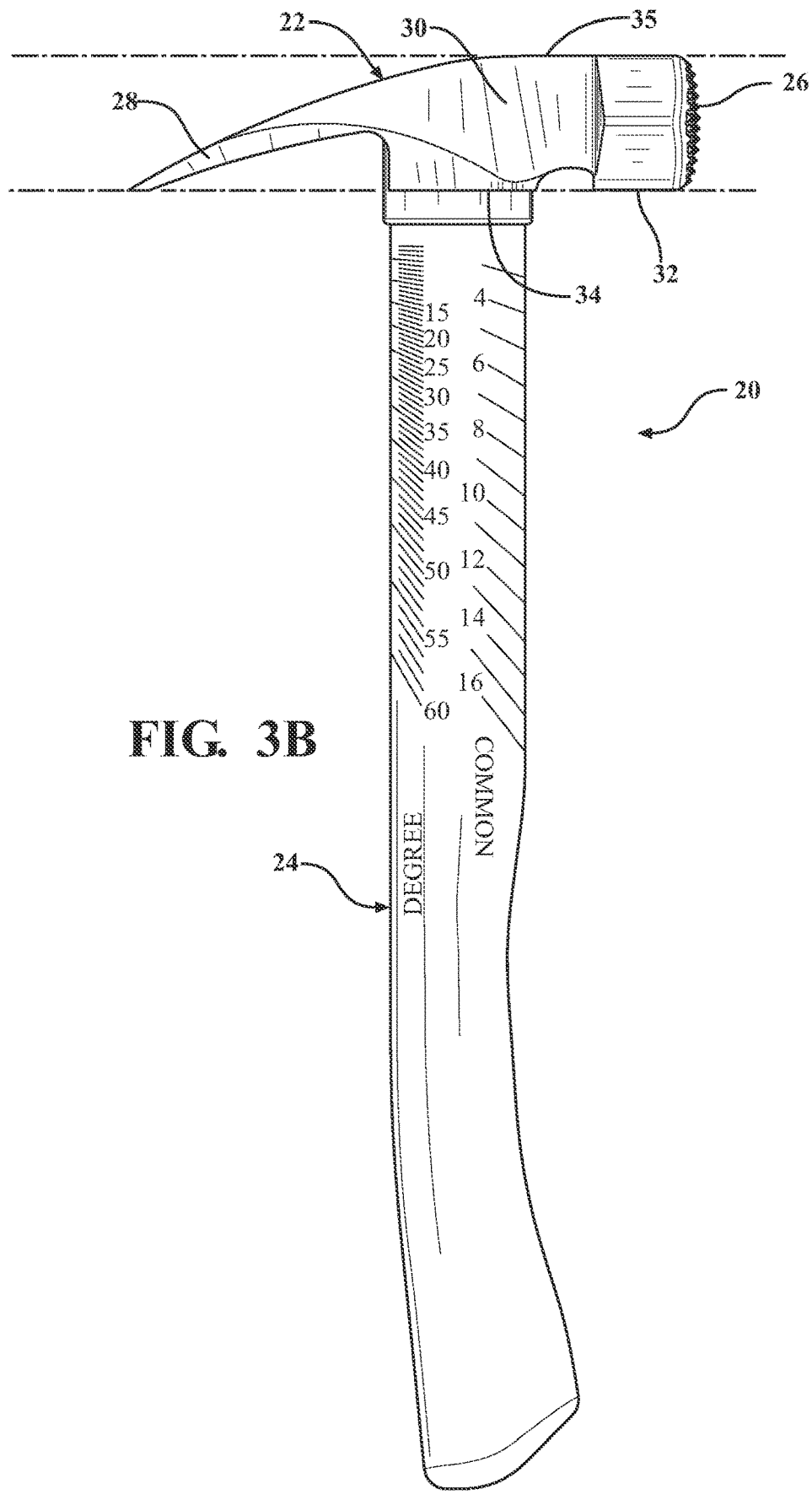
FIG. 3B is a back elevation view of the hammer of FIG. 1.

The hammer 20 can also be used to conveniently and easily measure and draw desired angles other than ninety degrees (90°) onto objects, such as drywall sheets or wood boards. Referring now to FIG. 3A, adjacent the length indicia, the front surface of the handle 24 is provided with angle indicia that is accompanied with a plurality of lines that all point directly to the ends of the claws 28 and that indicate respective angles from the ends of the claws 28 relative to the first plane. The angle indicia on the front surface of the exemplary embodiment of the handle 24 uses the units of degrees. Referring now to FIG. 3B, a back surface of the handle 24 is provided with two different sets of angle indicia. One set of angle indicia is measured in the units of degrees, and the other set is common cuts measured in rise over run ratios with the run being fixed at 12. For example, in the exemplary embodiment, the common cuts angle indicia includes markings which correspond with 2:12, 4:12, 8:12, 10:12, 14:12, and 16:12 common cuts.

Figure 5:
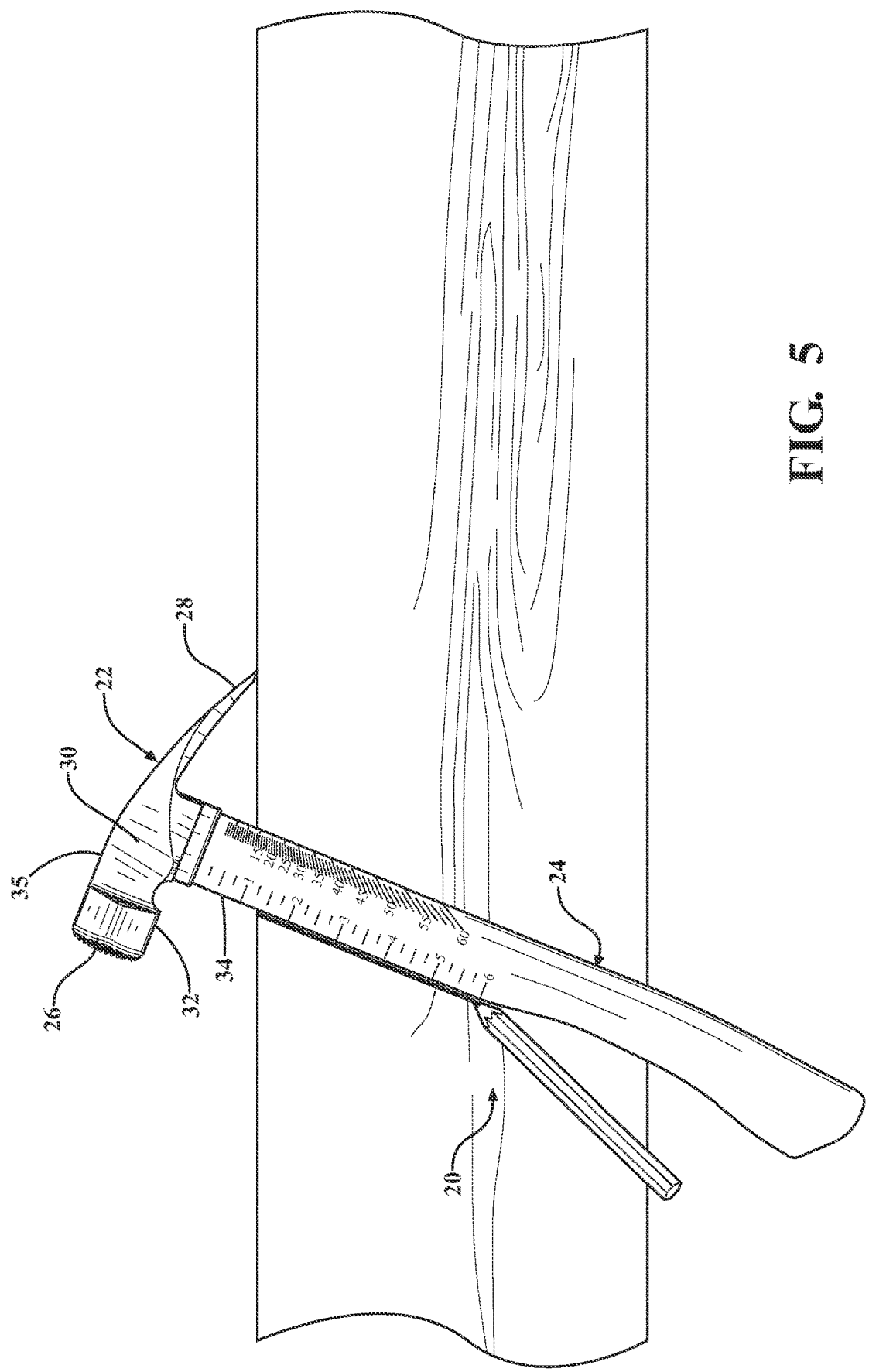
FIG. 5 shows the hammer of FIG. 1 being used to draw a prescribed angle on a wood board.
Figure 8:
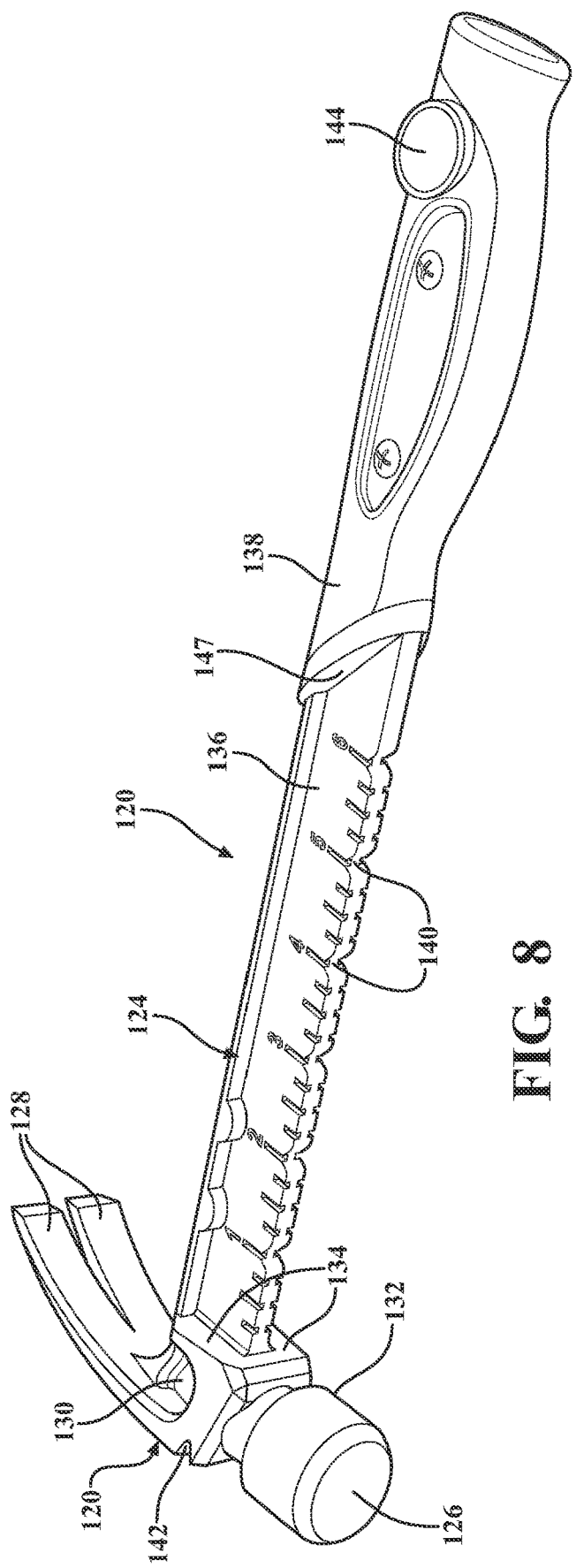
FIG. 8 is a perspective view of a hammer constructed according to a second embodiment of the present invention.
Figure 9:
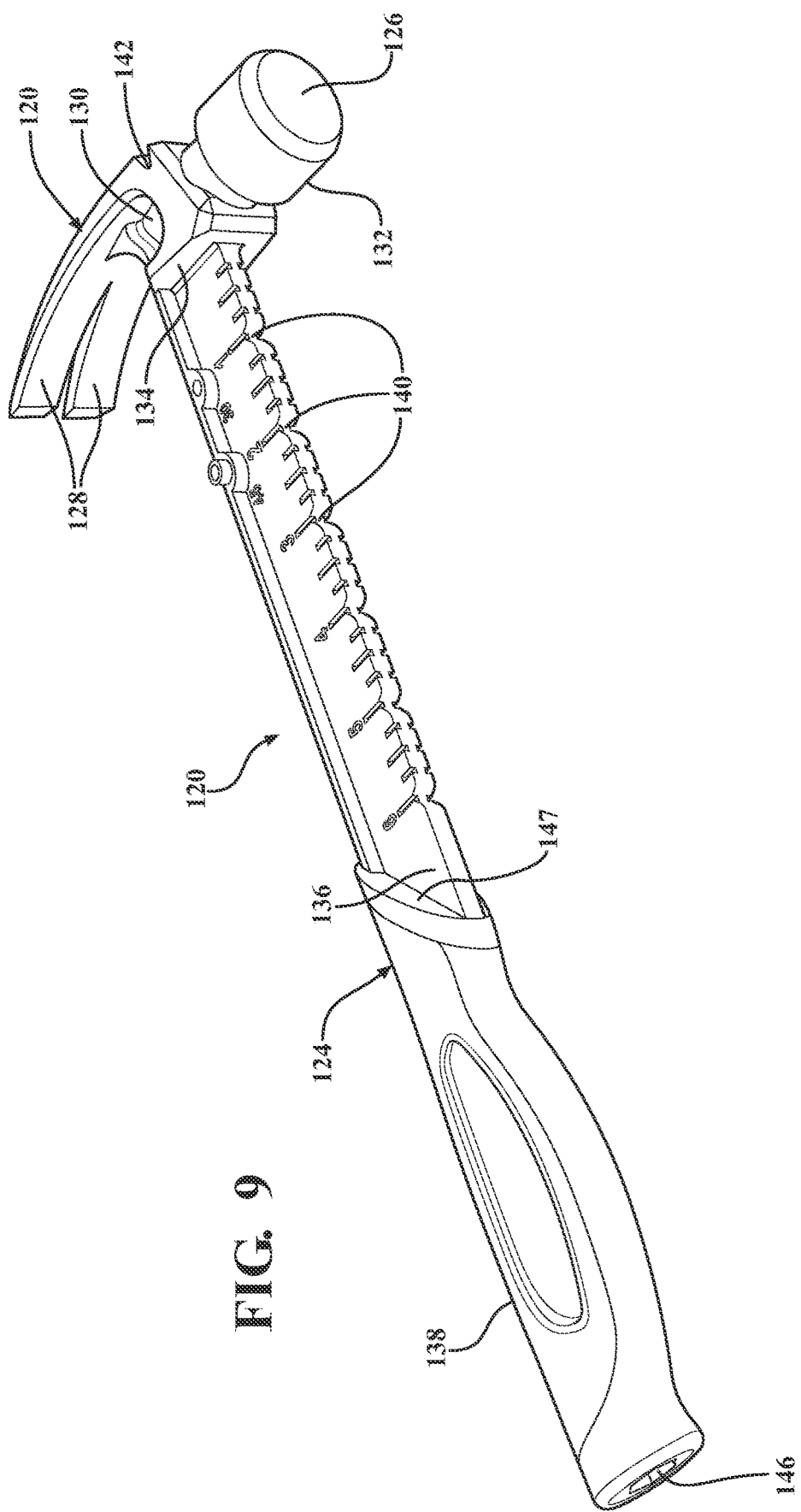
FIG. 9 is another perspective view of the hammer of FIG. 8 taken from a different perspective than FIG. 8.

As shown in FIG. 5, to draw an angled line, first the user, places the three co-planar features of the head 24 (the lower surface 32, the shoulder 34, and the ends of the claws 28) against a first surface on the wood board. Next, the user pivots the hammer 20 about the ends of the claws 28 until the first surface on the wood board is aligned with a desired angle indicia. The user then holds the hammer 20 at this particular orientation and traces along the linear portion of the handle 24 to draw a straight line onto the wood board at the desired angle. The indicia includes both degree markings and common cut markings which indicate common angles for cutting in the building construction industry. An angle can be measured by a similar process.

The hammer 20 can further be used to identify stud locations on, for example, a wood board or a drywall sheet. Referring to FIG. 6, a total length of the hammer 20 from a top surface of the head 22 to an end of the handle 24 is fourteen and a half inches (14.5 in), which matches the distance between facing surfaces of adjacent studs according to building codes in the United States. In an alternate embodiment, the total length of the hammer is sixteen inches (16 in), which matches the center-to-center distance between adjacent studs. In other embodiments, the total length of the hammer could match either the distance between adjacent studs or the center-to-center distance between adjacent studs according to building standards in different locations.

Additionally, the handle 24 has a width of one and a half inch (1.5 in), which is the standard thickness of a 2×4, 2×6, or 2×8 stud. Accordingly, once a user locates one stud on a sheet of drywall, the hammer 20 can be used to quickly mark out where the remaining studs are located by alternating between the arrangement of the hammer shown in FIG. 6 and the arrangement shown in FIG. 7 and marking the drywall sheet accordingly. This can save the user a great amount of time, particularly in the drywall industry and eliminates the need for a tape measure to perform this task.

Referring now to FIGS. 8-11, a second embodiment of the hammer 120 is generally shown with like numerals, separated by a prefix of "1", indicating corresponding parts with the first exemplary embodiment described above. In the second exemplary embodiment, the handle 124 is made mostly out of metal (as opposed to wood in the case of the first exemplary embodiment) and has a measuring portion 136 and a gripping portion 138. The gripping portion 138 is fixedly attached with the measuring portion 136 via a pair of screws which extend through aligned openings in both of the measuring and gripping portions 136, 138.

The measuring portion 136 of the handle 124 includes ruler measuring indicia on one side and extends linearly on an opposite side. On the side with the measuring indicia, notches 140 are provided at certain locations, such as at each inch, so that a user can easily make markings at these often used locations. The linear opposite side of the handle 124 allows for the hammer 120 to be used to draw straight edges.

Figure 11:
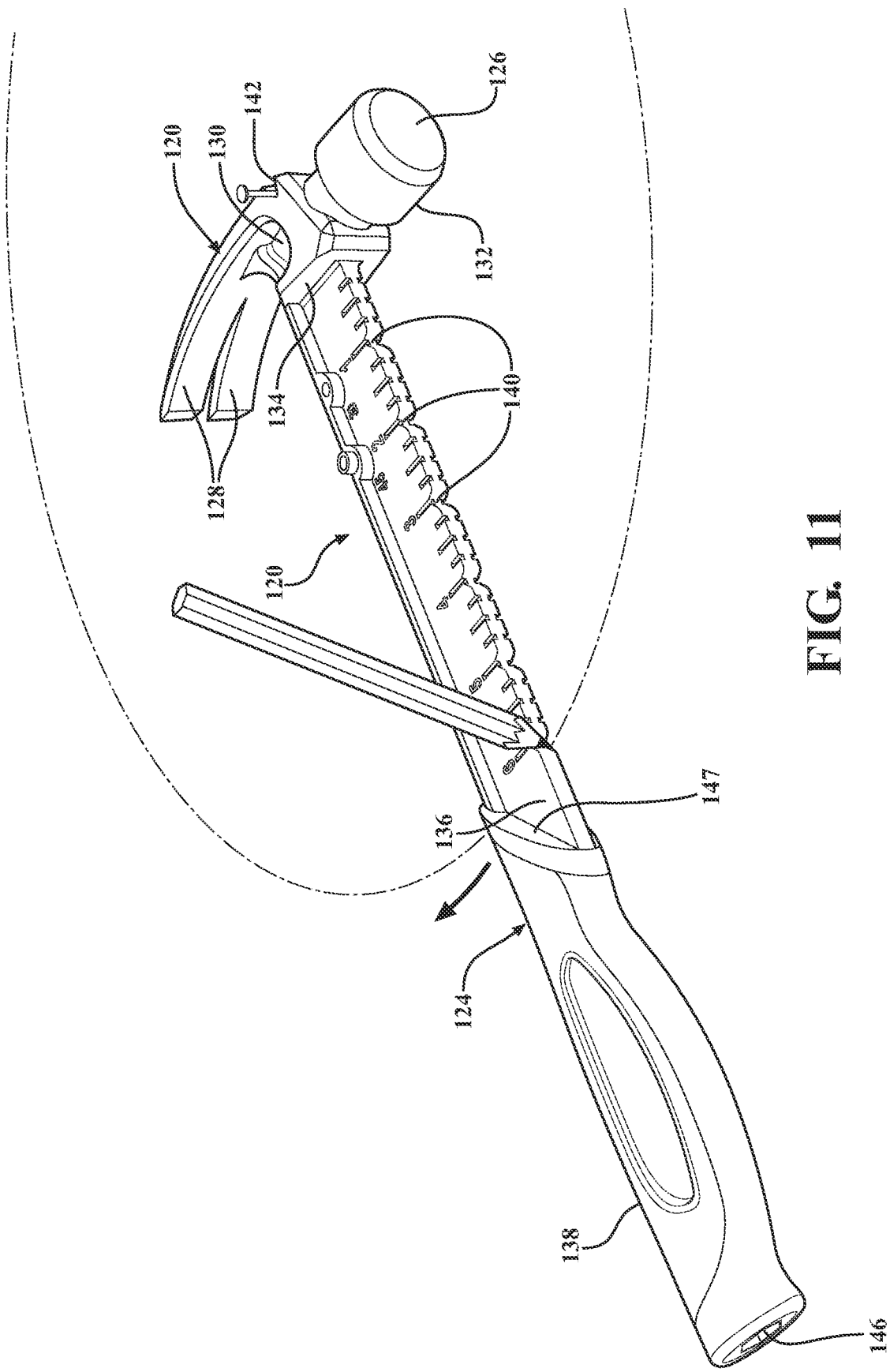
FIG. 11 shows the hammer of FIG. 8 being used to draw a circle on a sheet of drywall.

The hammer 120 can also be used to draw circles onto a surface, such as on a drywall sheet. With reference to FIG. 11, to perform this function, a top surface of the head 122 is provided with a groove 142 which receives a projection, such as a nail, which will serve as a center of the circle. The user then places a pencil (or any suitable writing instrument) into one of the notches 140 formed into the handle 124 and rotates the hammer 120 three hundred and sixty degrees (360°) around the projection to draw the circle.

The hammer 120 further has features which allow it to detect studs behind a sheet of drywall and to tighten certain types of fasteners. Specifically, a magnet 144 is disposed in the gripping portion 138. A user can grip the hammer 120 by the head 122 and hold the gripping portion 138 up against a wall. The magnet 144 will be attracted to nails or screws, thereby identifying to the user the locations of the studs in the wall. Further, a bottom end face of the gripping portion 138 has a hexagonal shaped opening 146 which can receive and be used to tighten certain types of fasteners. In the exemplary embodiment, the hexagonally-shaped opening 146 is sized to receive thirteen millimeters (13 mm) and one half inch (0.5 in) fasteners.

Figure 10:
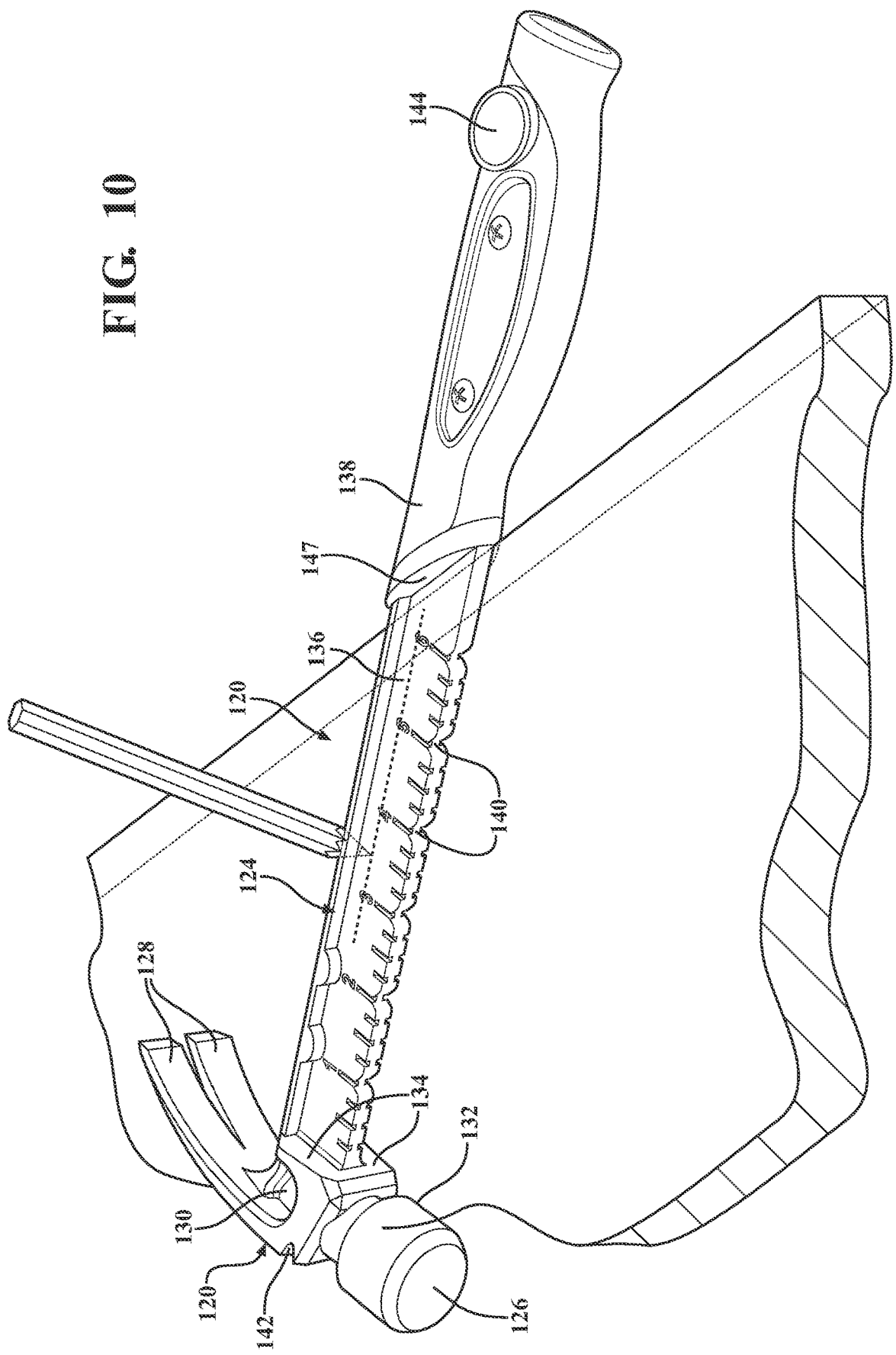
FIG. 10 is a perspective view of the hammer of FIG. 8 being used to draw a forty-five degree (45°) angle.

Further, the handle 124 includes a shoulder 147 which separates the measuring portion 136 from the gripping portion 138 and which is angled at a forty-five degree (45°) angle relative to the first plane and relative to the measuring portion 136. Thus, as shown in FIG. 10, the shoulder 147 can be placed against a surface on a work piece (such as a board of lumber) and one of the side surfaces of the measuring portion 136 can then be used as a straight edge to draw a forty-five degree (45°) line.

Figure 12:
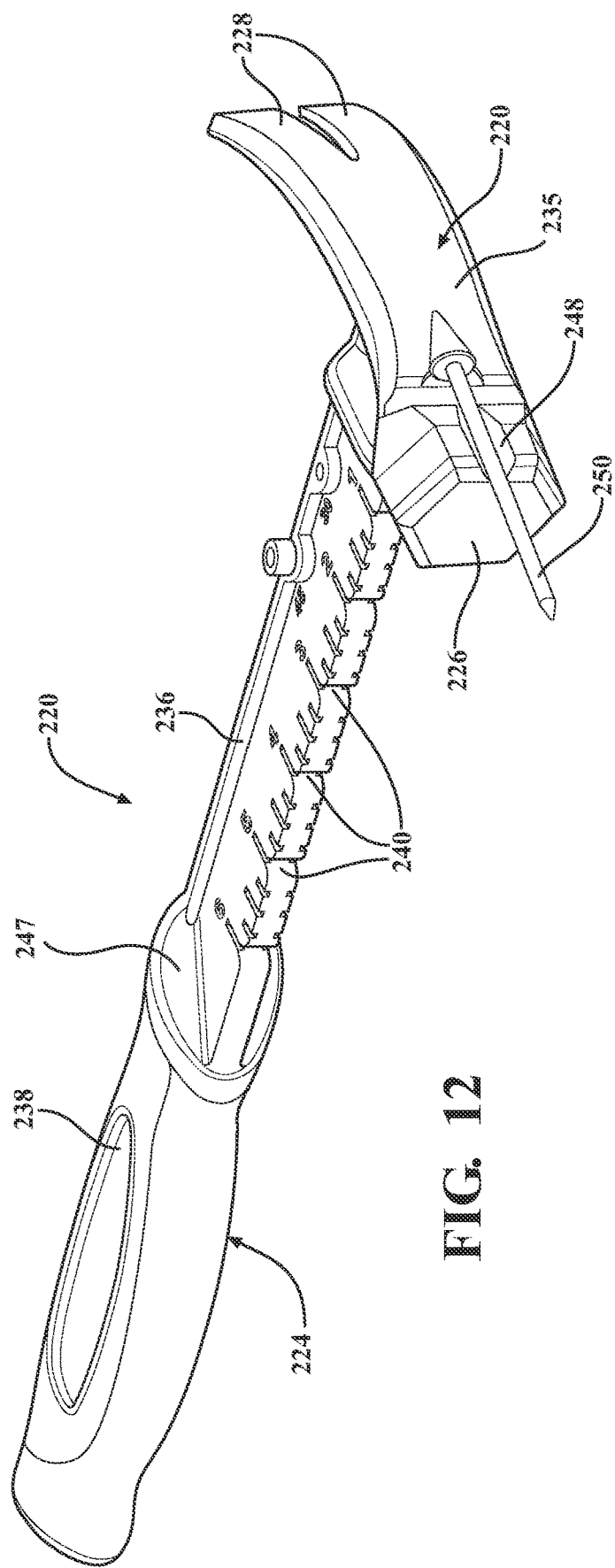
FIG. 12 is a perspective view of a hammer constructed according to a third embodiment of the present invention.
Figure 13:
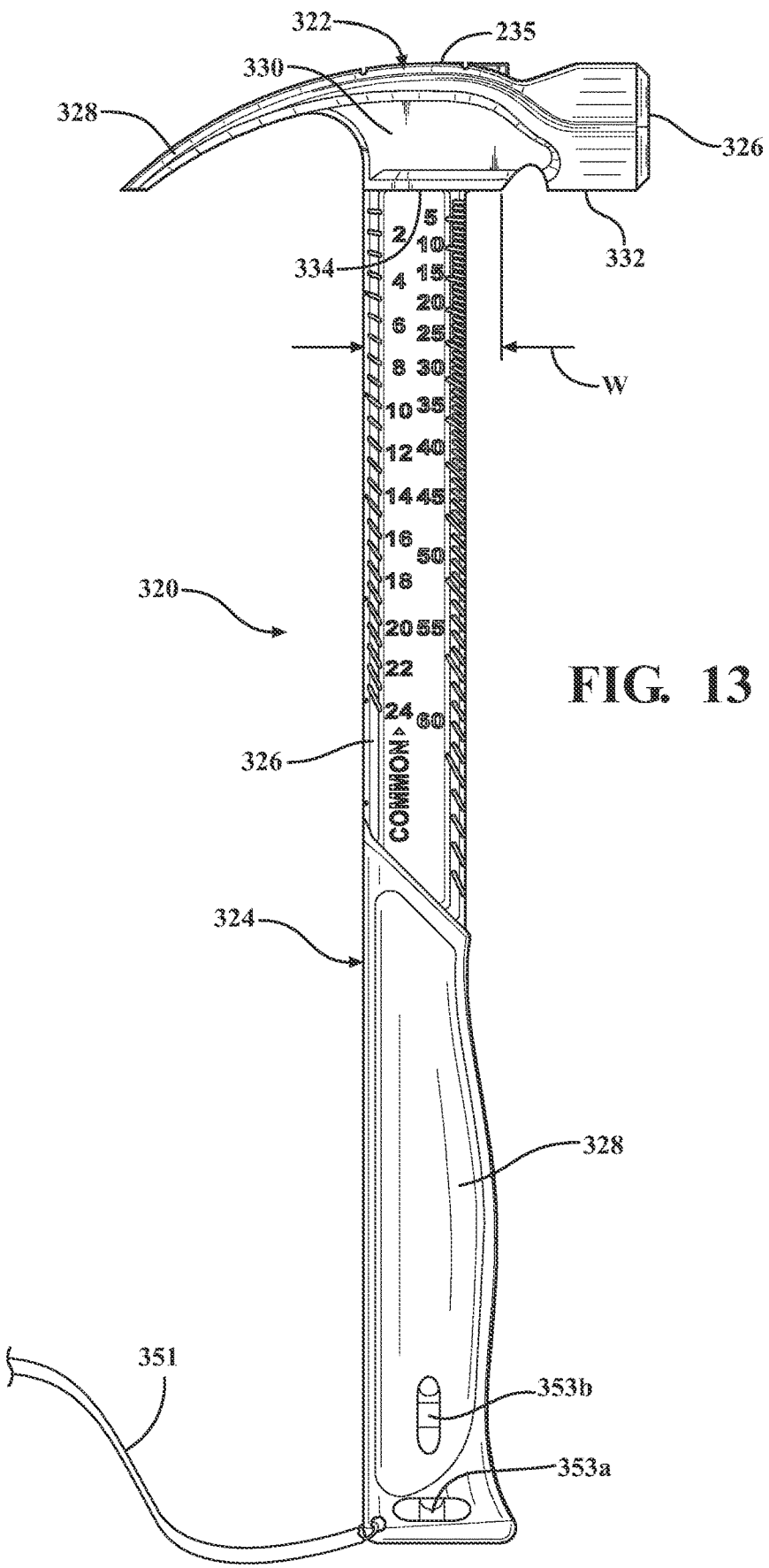
FIG. 13 is a front elevation view of a hammer constructed according to a fourth embodiment of the present invention.

Referring now to FIGS. 12 and 13, a third exemplary embodiment of the hammer 220 is generally shown with like numerals, separated by a prefix of "2", indicating corresponding parts with the first two embodiments described above. In the third embodiment, the head 222 of the hammer 220 is provided with a nail starting feature in the form of a channel 248 which is located on an upper surface of the head 222. The channel 248 extends from a forwardly facing nail starting surface on the head 222 and opens at the face 226. A nail 250 can be placed in the channel 248 with a head of the nail 250 resting against the nail starting surface and with the sharp end of the nail 250 projecting past the face 226 of the hammer 220. In this fashion, a user can controllably pound the nail 250 into a precise location without having to hold the nail 250 with his or her fingers. Referring now to FIG. 11, a fourth exemplary embodiment of the hammer 320 is generally shown with like numerals, separated by a prefix of "3", indicating corresponding parts with the first three embodiments described above. In this embodiment, the measuring portion 336 of the handle 324 has measuring indicia on both sides (specifically, angles on one side and lengths on the other side) without the notches found in the second and third embodiments.

In contrast to the first embodiment shown in FIGS. 1-7, the handle 324 of the fourth embodiments has a width which is less than one and a half inches (1.5 in). Thus, as shown in FIG. 13, in this embodiment, the shoulder 334 of the head 322 has a width W which is one and a half inches (1.5 in) to match stud width.

Further, the fourth embodiment of the hammer 320 includes a lanyard 351 adjacent a bottom end of the handle 224. The lanyard 351 can be attached to an article of clothing on a user so that, in the event that a user drops the hammer 320, it will only fall as long as the lanyard 351. The length of the lanyard 351 should be long enough to not impair use of the hammer 320. The gripping portion 328 of the handle 324 further includes a pair of bubble levels 353a, 353b oriented perpendicularly to one another. One of the bubble levels 353a can measure the orientation of an object when the uppermost surface 335 or the co-planar features (the lower surface 332, the shoulder 334, and the ends of the claws 328) are placed against an object.

Figure 15:
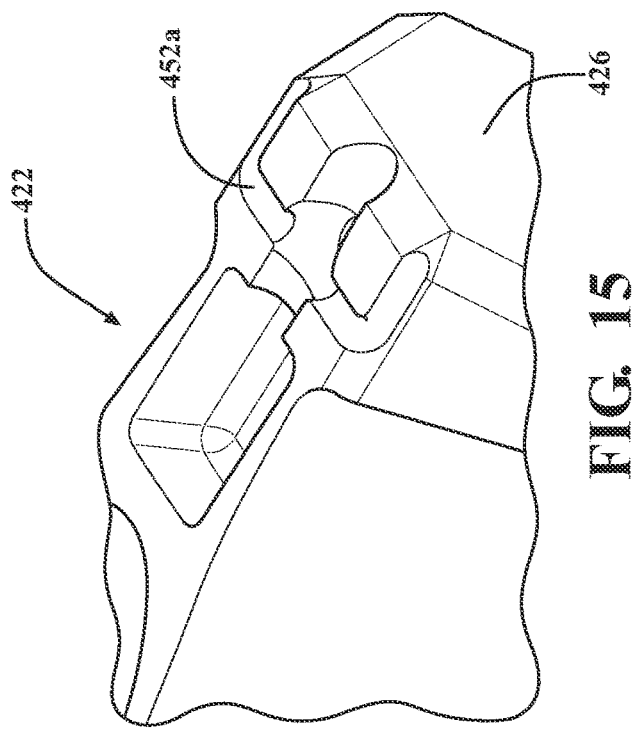
FIG. 15 is an enlarged view of a portion of FIG. 14.
Figure 14:
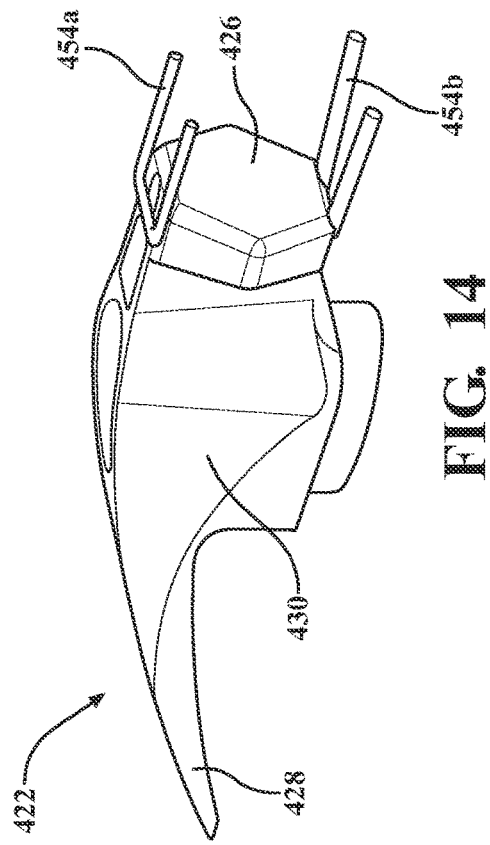
FIG. 14 is a perspective view of an alternate head for a hammer.
Figure 16:
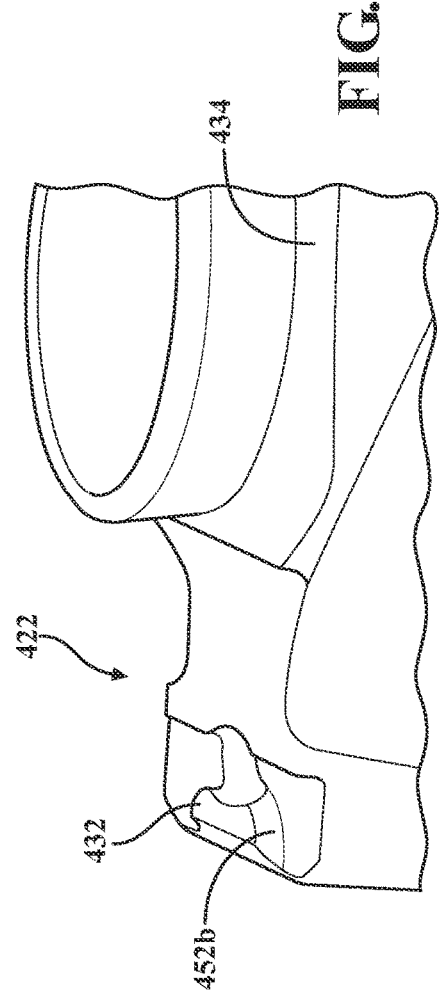
FIG. 16 is an enlarged view of a different portion of FIG. 14 than FIG. 14.

Turning now to FIGS. 14-16, an alternate embodiment of a head 424 for a hammer, such as any of the first four embodiments shown in FIGS. 1-13 and discussed above, is shown with like numerals, separated by a prefix of "4", indicating corresponding parts with the above-described embodiments. In this embodiment, the head 424 has a pair of staple grooves 452a, 452b for holding staples 454a, 454b. One of the grooves 452a is formed into a top of the head 422 and is U-shaped for holding a U-shaped Romex staple 454a, which are commonly used by electricians for holding wires against studs in buildings. The other groove 452b is formed into a bottom of the head 422 and is V-shaped for holding a V-shaped fencing staple 454b, of the type commonly used by ranchers to install fences.

Figure 17:
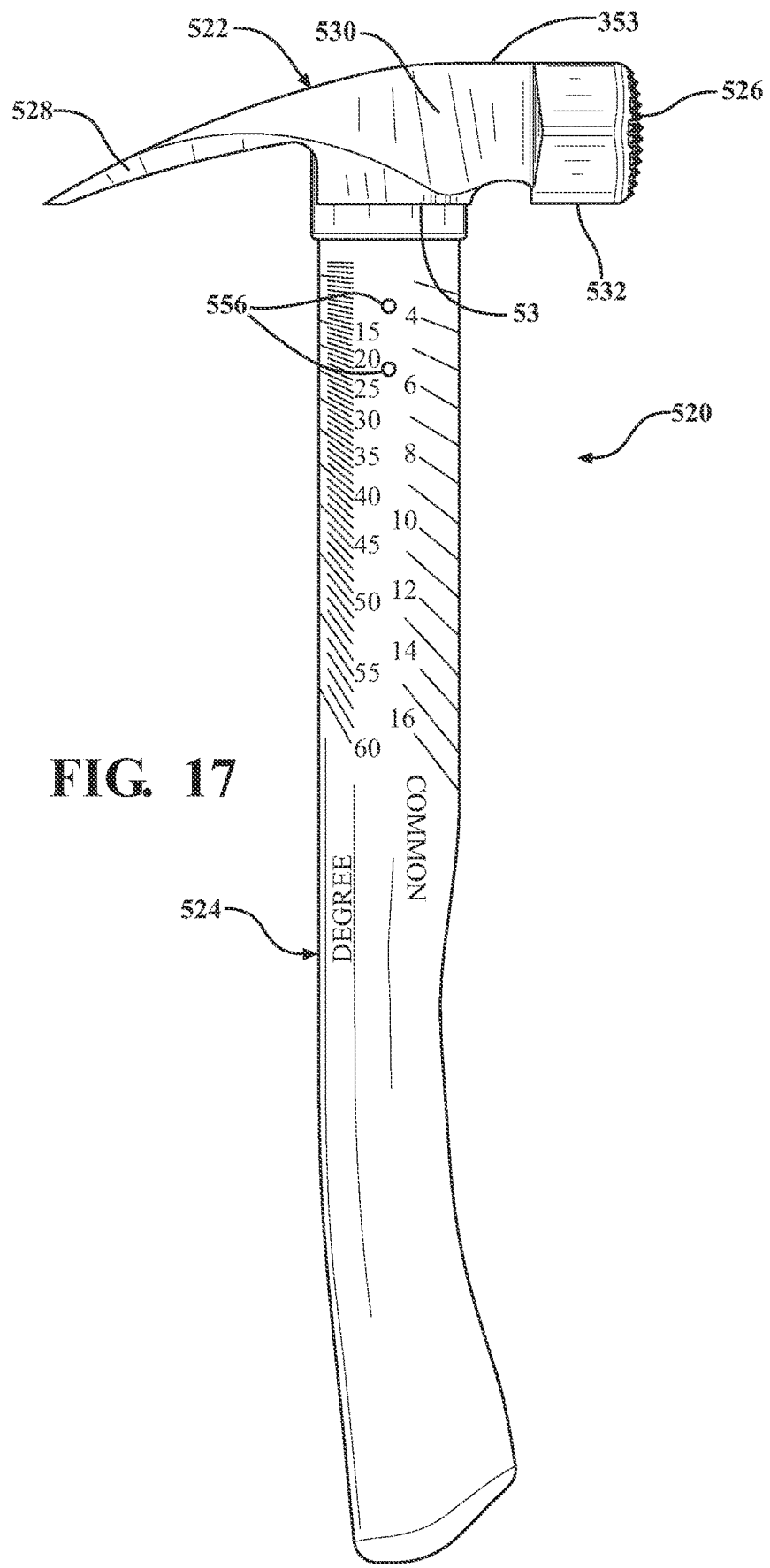
FIG. 17 is a front elevation view of a hammer constructed according to a fifth embodiment of the present invention.
Figure 18:
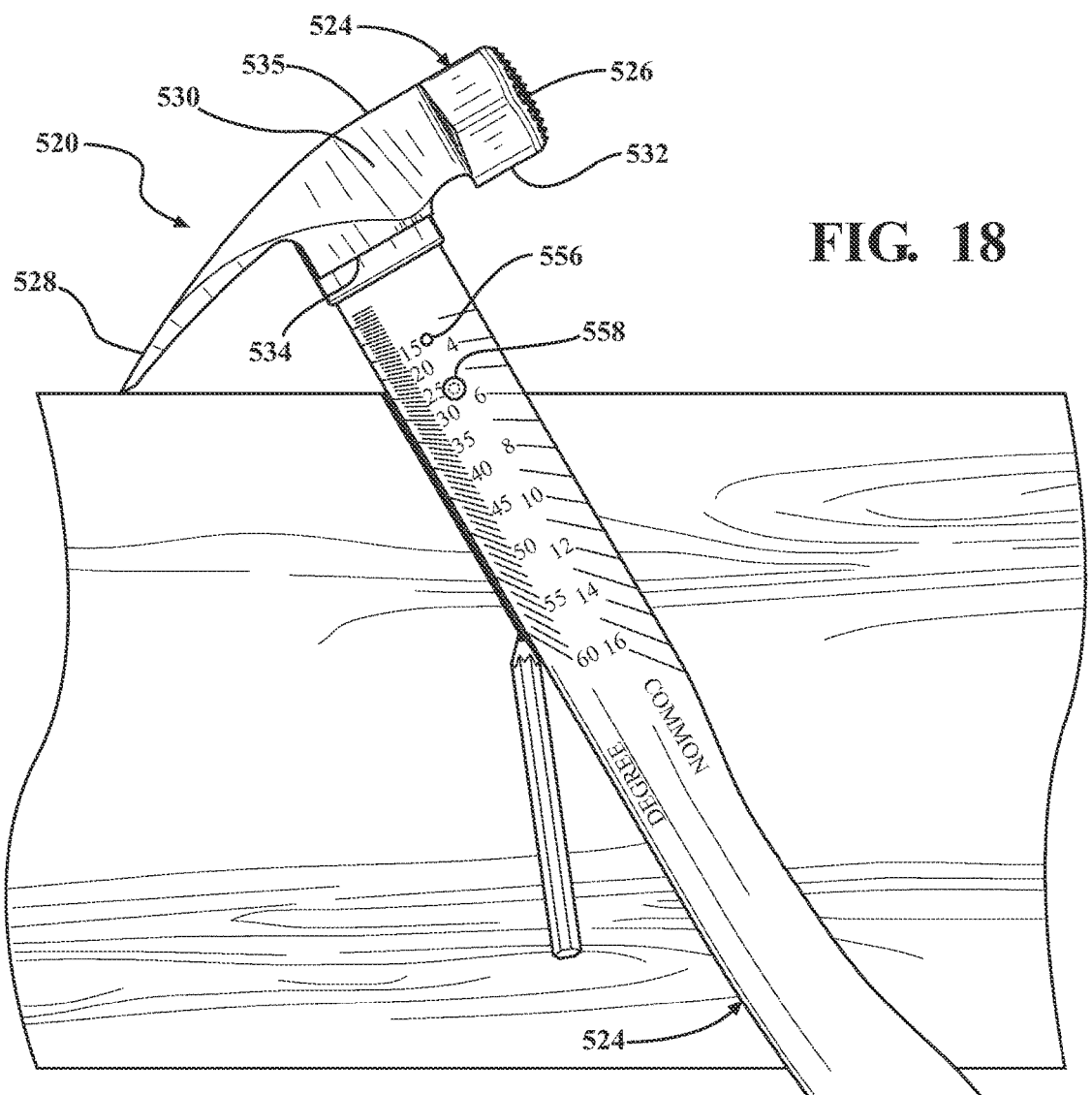
FIG. 18 is a front view showing the hammer of FIG. 17 being used to draw an angled line on a work piece.

Referring now to FIGS. 17 and 18, a fifth embodiment of the hammer 520 is shown with like numerals, separated by a prefix of "5", indicating corresponding parts with the above-described embodiments. This hammer 520 is similar to the first embodiment shown in FIGS. 1-7 but further includes a pair of openings 556. The openings 556 correspond with common cut angles indicated in the angle indicia. As shown in FIG. 18, a pin 558 can be inserted into and through one of the openings to hold the hammer 520 in a predetermined orientation corresponding to the desired angle.

Figure 19:
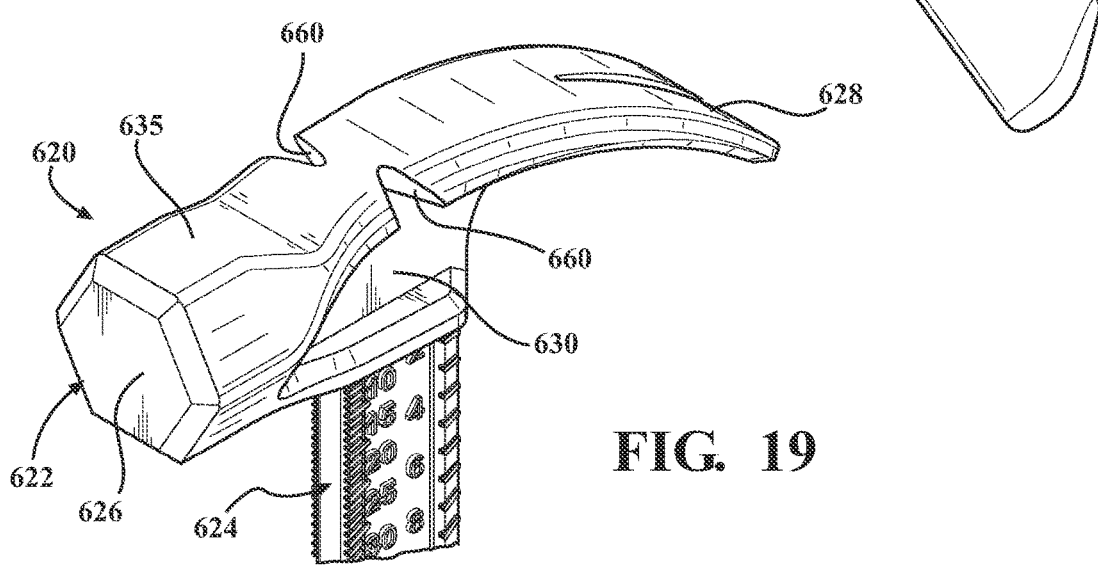
FIG. 19 is a fragmentary view showing a portion of a hammer constructed according to a sixth embodiment of the present invention.

Referring now to FIG. 19, a sixth embodiment of the hammer 620 is shown with like numerals, separated by a prefix of "6", indicating corresponding parts with the above-described embodiments. In this embodiment, the head 624 has a pair of longitudinally offset side nail pulling notches 660. The side nail pulling notches 660 face in opposite directions, and the offset allows the side nail pulling notches 660 to access more nails. In other words, one side nail pulling notch 660 can reach some nail heads that the other cannot and vice versa.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other. Further, it is to be understood that certain terms of direction, such as upper, lower, top, and bottom are in reference to the orientation of the hammer as shown in FIG. 1 and are not intended to be limiting.

What is claimed is:

1. A hammer, comprising:
    a head and a handle extending from the head;
    the head having a front portion with a striking face, a pair of cheeks, and a pair of claws that extend to rearmost distal ends, the rearmost distal ends of the claws lying in a common first plane with a planar lower surface of the front portion and with a shoulder on the cheeks, and wherein the claws are spaced from one another by a single groove that converges from the rearmost distal ends of the claws toward the cheeks and extend at an angle relative to the common first plane to the rearmost distal ends;
    at least one side surface of the handle extending linearly and perpendicularly to the first plane for allowing a user to draw a straight line which is perpendicular to the first plane; and
    one surface of the handle including a plurality of angle indicia with a plurality of lines, the plurality of lines being spaced apart from one another along the handle and each pointing directly towards the rearmost distal ends of the claws such that the plurality of spaced apart lines are non-parallel with respect to one another so that the hammer can be rotated about a pivot point established by the rearmost distal ends of the claws to a desired angle identified in the angle indicia so that a line at that desired angle can be drawn using the at least one side surface of the handle as a guide.

2. The hammer as set forth in claim 1, wherein a magnet is attached to a grip of the handle.

3. The hammer as set forth in claim 1, wherein the handle has a plurality of spaced apart notches.

4. The hammer as set forth in claim 3, wherein the head has a groove for receiving a projection on a surface and wherein a writing instrument can be placed in one of the notches and the hammer can be rotated about the projection to draw a circle.

5. The hammer as set forth in claim 1, wherein the head of the hammer includes a pair of staple grooves that are configured to hold staples.

6. The hammer as set forth in claim 1, wherein the hammer has a length of fourteen and a half inches, and a portion of the handle having a width that is one and a half inches.

7. The hammer as set forth in claim 1, wherein the hammer has a length of sixteen inches, and a portion of the handle having a width that is one and a half inches.

8. The hammer as set forth in claim 1, wherein the rearmost distal ends of the claws lie in the common first plane with the planar lower surface of the front portion and with the shoulder on the cheeks.

9. A method of marking stud locations on a work piece and drawing a line at a desired angle using a hammer, comprising the steps of:
    preparing a hammer that has a head and a handle extending from the head, the head having a front portion with a striking face, a pair of cheeks, and a pair of claws that extend to rearmost distal ends, the rearmost distal ends of the claws lying in a common first plane with a planar lower surface of the front portion and a shoulder on the cheeks, wherein the claws are spaced from one another by a single groove that converges from the rearmost distal ends of the claws toward the cheeks and extend at an angle relative to the common first plane to the rearmost distal ends, at least one side surface of the handle extending linearly and perpendicularly to the first plane, one surface of the handle including a plurality of angle indicia with a plurality of lines, the plurality of lines being spaced apart from one another along the handle and each pointing directly towards the distal ends of the claws such that the plurality of spaced apart lines are non-parallel with respect to one another;
    resting at least one of the rearmost distal ends of the claws against an edge of the work piece and resting at least one of the lower surface of the front portion and the shoulder of the cheeks against the edge of the work piece;
    pivoting the hammer about the at least one rearmost distal end of the claws to align one of the lines on the handle with the edge of the work piece; and
    drawing a line on the work piece using the at least one side surface of the handle that extends linearly and perpendicularly from the first plane.

10. The method as set forth in claim 9, wherein the handle further includes measurement indicia which indicates distance from the first plane.

11. The method as set forth in claim 9, wherein a magnet is attached to a grip of the handle.

12. The method as set forth in claim 9, wherein the handle has a plurality of spaced apart notches.

13. The method as set forth in claim 12, wherein the head has a groove for receiving a projection on a surface and wherein a writing instrument can be placed in one of the notches and the hammer can be rotated about the projection to draw a circle.

14. The method as set forth in claim 13, wherein the head of the hammer includes a pair of staple grooves that are configured to hold staples.

15. The method as set forth in claim 9, further including:
    marking a location of an edge of a first stud on the work piece;
    using the length of the hammer as a guide, marking a first edge of a second stud on the work piece, the second stud neighboring the first stud; and
    using the handle as a guide, marking a second edge of the second stud on the work piece.

16. The method as set forth in claim 9, further including resting at least one of the rearmost distal ends of the claws against an edge of the work piece and resting the lower surface of the front portion and the shoulder of the cheeks against the edge of the work piece.

* * * * *